3,822,256
CRYSTALLINE MONOHYDRATES OF SODIUM AND POTASSIUM CEPHALEXIN

Edmund Stanley Granatek, Syracuse, Frederick Lanny Grab, Fayetteville, and Frank Domenick Ruva, Auburn, N.Y., assignors to Bristol-Myers Company, New York, N.Y.
No Drawing. Filed June 8, 1972, Ser. No. 260,885
Int. Cl. C07d 99/24
U.S. Cl. 260—243 C          3 Claims

ABSTRACT OF THE DISCLOSURE

Crystalline sodium and potassium cephalexin monohydrates were prepared and found to be stable, useful forms of cephalexin.

BACKGROUND OF THE INVENTION

(1) Field of the Invention

The compounds of the present invention are antibacterial agents of the class commonly called cephalosporins.

(2) Description of the Prior Art

Cephalexin is an antibacterial agent used in human therapy and marketed as the monohydrate of the free acid (i.e., the zwitterion). It is described, for example, in J. Med. Chem. 12, 310–313 (1969) and J. Org. Chem. 36(9), 1259–1267 (1971) and in U.S. 3,507,861, U.K. 1,174,335 and Canada 856,786.

There are numerous disclosures of alternative methods for the production and purification of cephalexin (as the free acid). Examples include Belgium 696,026 (Farmdoc 29,494), Netherlands 6905073 (Farmdoc 40,228), Belgium 737,761 (Farmdoc 12,621R), South Africa 1260/67 (Farmdoc 282,654), Netherlands 7010977 (Farmdoc 24,140S), Netherlands 7010978 (Farmdoc 24,141S). All of this art describes the production of sodium cephalexin and potassium cephalexin only in general terms (as by conventional methods) and does not give any specific directions for producing the salts (except as is implicit in production in aqueous media as during hydrogenation). In no case are these salts isolated or their particular properties described. In particular, there is no description of crystalline form or degree of hydration for either sodium cephalexin or potassium cephalexin.

Various disclosures with regard to crystalline forms and hydrates of cephalexin free acid only are given, for example, in Journal of Pharmaceutical Sciences, 59(12), 1809–1814 (1970), in U.S. Pats. 3,502,663, 3,531,481 and 3,655,656 (all Farmdoc 78,507R) and Canada 888,195 (and Belgium 764,055; Farmdoc 60,231S).

SUMMARY OF THE INVENTION

The present invention provides a specific crystalline form of sodium cephalexin monohydrate and of potassium cephalexin monohydrate and processes for their preparation. These compounds are useful antibacterial agents in animal therapy, including man, possess good stability and provide effective blood levels on both oral and parenteral administration. Their precise and reproducible chemical and physical nature make them highly suitable for efficient commercial production and subsequent formulation.

Thus, the present invention provides crystalline potassium cephalexin monohydrate exhibiting essentially the following X-ray powder diffractogram data:

| Line | Spacing d (A.) | Relative intensity |
|---|---|---|
| 1 | 17.99 | 10 |
| 2 | 16.32 | 100 |
| 3 | [1] 11.07 | 10 |
| 4 | 9.36 | 15 |
| 5 | 8.30 | 45 |
| 6 | 7.92 | 20 |
| 7 | 6.00 | 5 |
| 8 | 4.75 | 30 |
| 9 | [1] 4.58 | 25 |
| 10 | [1] 4.32 | 5 |
| 11 | 4.06 | 35 |
| 12 | 3.82 | 30 |
| 13 | 3.67 | 20 |
| 14 | 3.32 | 15 |
| 15 | [1] 3.15 | 5 |
| 16 | [1] 3.00 | 15 |
| 17 | 2.78 | 5 |

[1] Wide.

The present invention also provides crystalline sodium cephalexin monohydrate exhibiting essentially the following X-ray powder diffractogram data:

| Line No. | Spacing d (A.) | Relative intensity |
|---|---|---|
| 1 | 17.68 | 15 |
| 2 | 15.68 | 100 |
| 3 | 10.42 | 50 |
| 4 | 9.50 | 20 |
| 5 | 7.75 | 80 |
| 6 | 5.91 | 30 |
| 7 | 5.10 | 25 |
| 8 | [1] 4.67 | 70 |
| 9 | 4.34 | 30 |
| 10 | 4.25 | 15 |
| 11 | 4.00 | 50 |
| 12 | 3.88 | 30 |
| 13 | [1] 3.78 | 30 |
| 14 | [1] 3.65 | 30 |
| 15 | 3.53 | 10 |
| 16 | [1] 3.35 | 5 |
| 17 | [1] 3.27 | 5 |
| 18 | [1] 3.12 | 5 |
| 19 | [1] 3.04 | 30 |
| 20 | 2.72 | 10 |

[1] Wide.

The crystals defined above are produced by dissolving cephalexin (preferably its monohydrate) in an organic solvent, preferably dry and preferably a halogenated hydrocarbon such as methylene chloride or an aliphatic alcohol such as isopropyl alcohol in the presence of at least one equivalent of a base which is preferably a tertiary amine such as triethylamine to form a solution which is then mixed with a preformed solution of a solvent-soluble, strong base (preferably the sodium or potassium salt of a higher aliphatic acid such as 2-ethylhexanoic acid or else sodium ethanoate or sodium t-butoxide or the like) in a preferably anhydrous solvent which is preferably an alcohol such as isopropyl alcohol, methanol, ethanol or t-butyl alcohol to produce and precipitate the product.

In the treatment of bacterial infections in man, the compounds of this invention are administered topically, orally and parenterally in accordance with conventional procedures for antibiotic administration in an amount of from about 5 to 125 mg./kg./day and preferably in the range of 15 to 50 mg./kg./day in divided dosages, e.g., three or four times a day. They are administered in dosage units containing, for example, 125, 250, 500, 1000, and 2000 mg. of active ingredient with suitable physiologically acceptable carriers or excipients. The dosage units can be in the form of liquid preparations such as solutions, dispersions, emulsions or in solid form such as tablets, capsules, etc.

These examples are given in illustration of, but not in limitation of, the present invention. All temperatures are in degree Centigrade. "Skellysolve B" is a petroleum ether fraction of B.P. 60–68° C. consisting essentially of n-hexane.

DESCRIPTION OF THE PREFERRED EMBODIMENTS

Example 1.—Synthesis of Sodium Cephalexin Monohydrate

To 12 gm. (0.0327 moles) of cephalexin monohydrate in 100 ml. of isopropyl alcohol (IPA) at 25° C. was added 16 ml. (0.113 moles) of triethylamine (TEA) and 16 ml. of deionized water. To the clear solution was added 100 ml. of isopropyl alcohol and over a five minute interval 20 ml. (0.036 moles) of 30% solution of sodium ethyl-hexanoate (SEH) in isopropyl alcohol was added. After stirring for 30 minutes at 25° C. (room temperature), 200 ml. of isopropyl alcohol was added. After stirring for one hour at 0° C., the reaction mixture was filtered and the precipitate was dried in a vacuum oven for 15 to 20 hours at 20° C. to 25° C. (room temperature). After drying the material was a white, crystalline powder with a yield of 11.45 gm., 90% yield, IR, NMR, elemental analysis and bioassay were consistent.

$C_{16}H_{16}N_3SO_4 \cdot Na \cdot H_2O$ requires: C, 49.60, H, 4.66, N, 10.85, $H_2O$, 4.65.
Found: C, 49.39, H, 4.76, N, 10.64, $H_2O$, 5.25.
Theoretical Biopotency: 897 mcg./mg.
Experimental Biopotency: 915 mcg./mg.
Crystal Form: Football to short needle shaped
Melting Point: 175–225° C. with decomposition.

The sodium cephalexin so formed has been used to formulate oral and parenteral dosage forms, i.e. powders, capsules and foils.

Example 2.—Synthesis of Potassium Cephalexin Monohydrate

To 12 gm. (0.0327 moles) of cephalexin monohydrate in 100 ml. of isopropyl alcohol at 25° C. was added 16 ml. (0.113 moles) of triethylamine and 12 ml. of deionized water. To the clear solution was added 100 ml. of isopropyl alcohol and over a five minute interval there was added 22 ml. (0.036 moles) of 30% solution of potassium ethylhexanoate (KEH) in isopropyl alcohol. After stirring for 30 minutes at 25° C. (room temperature) 200 ml. of isopropyl alcohol was added. After stirring for one hour at 0° C. the reaction mixture was filtered and the precipitate was dried in a vacuum oven for 15 to 20 hours at 20° C. to 25° C. (room temperature). After drying the material was a white, crystalline powder with a yield of 11.85 gm., 89% yield; IR, NMR, elemental analysis and bioassay were consistent.

$C_{16}H_{16}N_3SO_4 \cdot K \cdot H_2O$ requires: C, 47.60, H, 4.47, N, 10.40, $H_2O$, 4.48.
Found: C, 48.40, H, 4.39, N, 11.08, $H_2O$, 3.69.
Theoretical Biopotency: 860 mcg./mg.
Experimental Biopotency: 865 mcg./mg.
Crystal Form: Rosettes
Melting Point: 190° C.–230° C. with decomposition.

The potassium cephalexin so formed has been used to formulate oral and parenteral products, e.g. powders and capsules.

Example 3.—Synthesis of Sodium Cephalexin Monohydrate

Slurry 550 mg. (1.5 mmoles) of cephalexin monohydrate in 25.0 ml. of acetonitrile at 25° C. Add 1.25 ml. (5%) water to the suspension. Dissolution was achieved by adding 1.0 ml. (7 mmoles) of triethylamine. The clear solution may be rapidly polish filtered at this point. The sodium salt was formed by the dropwise addition of 1.0 ml. of a 30% solution of sodium ethyl-hexanoate in acetone (1.8 mmoles). A solid rapidly precipitated out of solution. The resultant system was diluted with 75.0 ml. of ethyl acetate. After one hour the white crystals were filtered and washed with ethyl acetate. Upon drying a yield of 470 mg., 89% of theoretical was obtained.

The IR and NMR spectra were consistent with the structure.

$C_{16}H_{16}N_3SO_4Na \cdot H_2O$ requires: C, 49.60, H, 4.69, N, 10.85, S, 8.28, $H_2O$, 4.65.
Found: C, 49.49, H, 4.62, N, 10.99, S, 8.58, $H_2O$, 4.63.
Theoretical Biopotency: 897 mcg./mg.
Experimental Biopotency: 908 mcg./mg.
Crystal Form: Short rods and needles.

The sodium cephalexin so formed has been used in formulating oral and parenteral dosage forms, i.e. powders, tablets, capsules and foils.

Example 4.—Procedure for Sodium Cephalexin Monohydrate

A. Preparation of SEH—IPA—$H_2O$

SEH—IPA (38.9% SEH) ($KFH_2O = 0.25\%$) is made up to 25% SEH and a water content of 10% in the following way:

644 ml. SEH—IPA (38.9% SEH) is stirred and 100 ml. deionized water is added. The solution is made up to 1000 ml. by the addition of isopropanol. This stock solution is used for the crystallization.

B. Preparation of sodium cephalexin monohydrate 1. 1000 g. (2.88 moles) of cephalexin (anhydrous form) is stirred with 8 liters of dry methylene chloride ($MeCl_2$) and 600 ml. of TEA (4.28 moles) at 20–25° C. (1.5 moles TEA/mole cephalexin). Stirring is continued until solution is obtained which occurs quite readily although a slight haze may be noted.

2. After solution is complete, 200 g. of activated charcoal ("Darco KB") is added and the slurry is stirred for 15 minutes.

3. The slurry is filtered and the cake is washed with methylene chloride to obtain a complete transfer of the product. A volume of about 12 liters should be obtained.

4. The methylene chloride solution is warmed to 38–40° C. At this point the system is near the boiling point. 600 ml. of methanol is added to the methylene chloride solution and it is immediately followed by the addition of 2000 ml. of the previously prepared SEH—IPA—$H_2O$ solution over a period of a few minutes. The addition rate is made slowly enough so a great deal of turbidity does not result (but otherwise as rapidly as possible because it has been shown that if crystallization does not take place promptly, decomposition results and low potency product is obtained). A slight turbidity is noted after the complete addition.

5. 6 liters of ethyl acetate is added over 4–5 minutes. The temperature is held at about 38° C. during the addition. The solution is seeded with sodium cephalexin crystals and the crystallization should start quite readily. If the crystallization is not apparent after 5 minutes, 1.5 liters of ethyl acetate is added. The slurry is stirred for 20 minutes and 4.5 liters more of ethyl acetate is added over a few minutes (total ethyl acetate 12.0 liters).

6. The slurry is stirred at 35–38° C. for 15 minutes and the temperature is dropped slowly over 30 minutes to 20° C. The slurry is stirred for 1 hour at 20° C.

7. The slurry is filtered and the cake is washed with 12 liters of ethyl acetate-$MeCl_2$ (50–50) followed by 12 liters of ethyl acetate. The cake is dried in a vacuum oven at about 25° C. In the laboratory, the cake was dried in a vacuum desiccator overnight. (The cake could probably be dried at 30° C. under high vacuum.)

8. The yield is about 1000 g. of sodium salt (88–90%).

X-RAY POWDER FILMS OF SODIUM CEPHALEXIN MONOHYDRATE AND POTASSIUM CEPHALEXIN MONOHYDRATE

The X-ray diffraction patterns of the above materials were taken in a Debye-Scherrer powder camera 114.6 mm. in diameter. The radiation used was $CuK_\alpha$ filtered with vanadium. The powder (200 mesh) was supported in a Lindemann capillary 0.3 mm. in diameter. Interplanar spacings [$d(A.)$] are given below as well as the relative intensities of the lines as estimated visually.

POTASSIUM CEPHALEXIN MONOHYDRATE

| Line | Spacing d (Å.) | Relative intensity |
|---|---|---|
| 1 | 17.99 | 10 |
| 2 | 16.32 | 100 |
| 3 | ¹ 11.07 | 10 |
| 4 | 9.36 | 15 |
| 5 | 8.30 | 45 |
| 6 | 7.92 | 20 |
| 7 | 6.00 | 5 |
| 8 | 4.75 | 30 |
| 9 | ¹ 4.58 | 25 |
| 10 | ¹ 4.32 | 5 |
| 11 | 4.06 | 35 |
| 12 | 3.82 | 30 |
| 13 | 3.67 | 20 |
| 14 | 3.32 | 15 |
| 15 | ¹ 3.15 | 5 |
| 16 | ¹ 3.00 | 15 |
| 17 | 2.78 | 5 |

¹ Wide

SODIUM CEPHALEXIN MONOHYDRATE

| Line | Spacing d (Å.) | Relative intensity |
|---|---|---|
| 1 | 17.68 | 15 |
| 2 | 15.68 | 100 |
| 3 | 10.42 | 50 |
| 4 | 9.50 | 20 |
| 5 | 7.75 | 80 |
| 6 | 5.91 | 30 |
| 7 | 5.10 | 25 |
| 8 | ¹ 4.67 | 70 |
| 9 | 4.34 | 30 |
| 10 | 4.25 | 15 |
| 11 | 4.00 | 50 |
| 12 | 3.88 | 30 |
| 13 | ¹ 3.78 | 30 |
| 14 | ¹ 3.65 | 30 |
| 15 | 3.53 | 10 |
| 16 | ¹ 3.35 | 5 |
| 17 | ¹ 3.27 | 5 |
| 18 | ¹ 3.12 | 5 |
| 19 | ¹ 3.04 | 30 |
| 20 | 2.72 | 10 |

¹ Wide.

We claim:

1. Crystalline potassium cephalexin monohydrate exhibiting essentially the following X-ray powder diffractogram data:

| Line | Spacing d (Å.) | Relative intensity |
|---|---|---|
| 1 | 17.99 | 10 |
| 2 | 16.32 | 100 |
| 3 | ¹ 11.07 | 10 |
| 4 | 9.36 | 15 |
| 5 | 8.30 | 45 |
| 6 | 7.92 | 20 |
| 7 | 6.00 | 5 |
| 8 | 4.75 | 30 |
| 9 | ¹ 4.58 | 25 |
| 10 | ¹ 4.32 | 5 |
| 11 | 4.06 | 35 |
| 12 | 3.82 | 30 |
| 13 | 3.67 | 20 |
| 14 | 3.32 | 15 |
| 15 | ¹ 3.15 | 5 |
| 16 | ¹ 3.00 | 15 |
| 17 | 2.78 | 5 |

¹ Wide

2. Crystalline sodium cephalexin monohydrate exhibiting essentially the following X-ray powder diffractogram data:

| Line | Spacing d (Å.) | Relative intensity |
|---|---|---|
| 1 | 17.68 | 15 |
| 2 | 15.68 | 100 |
| 3 | 10.45 | 50 |
| 4 | 9.50 | 20 |
| 5 | 7.75 | 80 |
| 6 | 5.91 | 30 |
| 7 | 5.10 | 25 |
| 8 | ¹ 4.67 | 70 |
| 9 | 4.34 | 30 |
| 10 | 4.25 | 15 |
| 11 | 4.00 | 50 |
| 12 | 3.88 | 30 |
| 13 | ¹ 3.78 | 30 |
| 14 | ¹ 3.65 | 30 |
| 15 | 3.53 | 10 |
| 16 | ¹ 3.35 | 5 |
| 17 | ¹ 3.27 | 5 |
| 18 | ¹ 3.12 | 5 |
| 19 | ¹ 3.04 | 30 |
| 20 | 2.72 | 10 |

¹ Wide.

3. The process for the preparation of crystalline potassium cephalexin monohydrate exhibiting essentially the following X-ray powder diffractogram data:

| Line | Spacing d (Å.) | Relative intensity |
|---|---|---|
| 1 | 17.99 | 10 |
| 2 | 16.32 | 100 |
| 3 | ¹ 11.07 | 10 |
| 4 | 9.36 | 15 |
| 5 | 8.30 | 45 |
| 6 | 7.92 | 20 |
| 7 | 6.00 | 5 |
| 8 | 4.75 | 30 |
| 9 | ¹ 4.58 | 25 |
| 10 | ¹ 4.32 | 5 |
| 11 | 4.06 | 35 |
| 12 | 3.82 | 30 |
| 13 | 3.67 | 20 |
| 14 | 3.32 | 15 |
| 15 | ¹ 3.15 | 5 |
| 16 | ¹ 3.00 | 15 |
| 17 | 2.78 | 5 |

¹ Wide.

or crystalline sodium cephalexin monohydrate exhibiting essentially the following X-ray powder diffractogram data:

| Line | Spacing d (Å.) | Relative intensity |
|---|---|---|
| 1 | 17.68 | 15 |
| 2 | 15.68 | 100 |
| 3 | 10.42 | 50 |
| 4 | 9.50 | 20 |
| 5 | 7.75 | 80 |
| 6 | 5.91 | 30 |
| 7 | 5.10 | 25 |
| 8 | ¹ 4.67 | 70 |
| 9 | 4.34 | 30 |
| 10 | 4.25 | 15 |
| 11 | 4.00 | 50 |
| 12 | 3.88 | 30 |
| 13 | ¹ 3.78 | 30 |
| 14 | ¹ 3.65 | 30 |
| 15 | 3.53 | 10 |
| 16 | ¹ 3.35 | 5 |
| 17 | ¹ 3.27 | 5 |
| 18 | ¹ 3.12 | 5 |
| 19 | ¹ 3.04 | 30 |
| 20 | 2.72 | 10 |

¹ Wide.

which process comprises dissolving cephalexin in an organic solvent in the presence of at least one equivalent of a base to form a solution and then mixing said solution with a preformed solution of a strong solvent-soluble sodium or potassium base to produce and precipitate the desired crystalline product, said process being characterized by solution of cephalexin monohydrate in methylene chloride, isopropyl alcohol or acetonitrile in the presence of triethylamine and subsequent mixing of said cephalexin solution with a preformed solution of sodium or potassium 2-ethyl-hexanoate in isopropyl alcohol or acetone.

References Cited

UNITED STATES PATENTS

| 3,502,663 | 3/1970 | Barnes | 260—243 C |
| 3,507,861 | 4/1970 | Morin et al. | 260—243 C |
| 3,676,437 | 7/1972 | Siddons | 260—243 C |
| 3,692,781 | 9/1972 | Oughton | 260—243 C |
| 3,728,341 | 4/1973 | Crisp et al. | 260—243 C |

NICHOLAS S. RIZZO, Primary Examiner

U.S. Cl. X.R.

424—246